Figure 4:
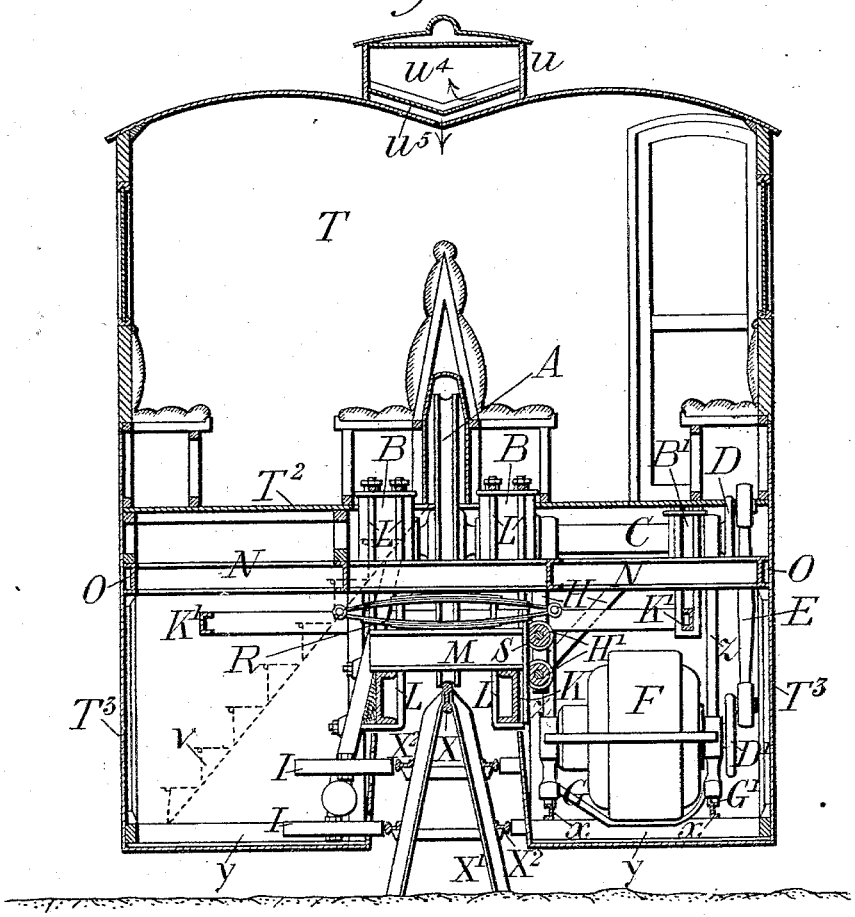

(No Model.) 6 Sheets—Sheet 1.
F. B. BEHR.
MOTOR VEHICLE FOR SINGLE RAIL ELEVATED RAILWAYS.
No. 552,812. Patented Jan. 7, 1896.
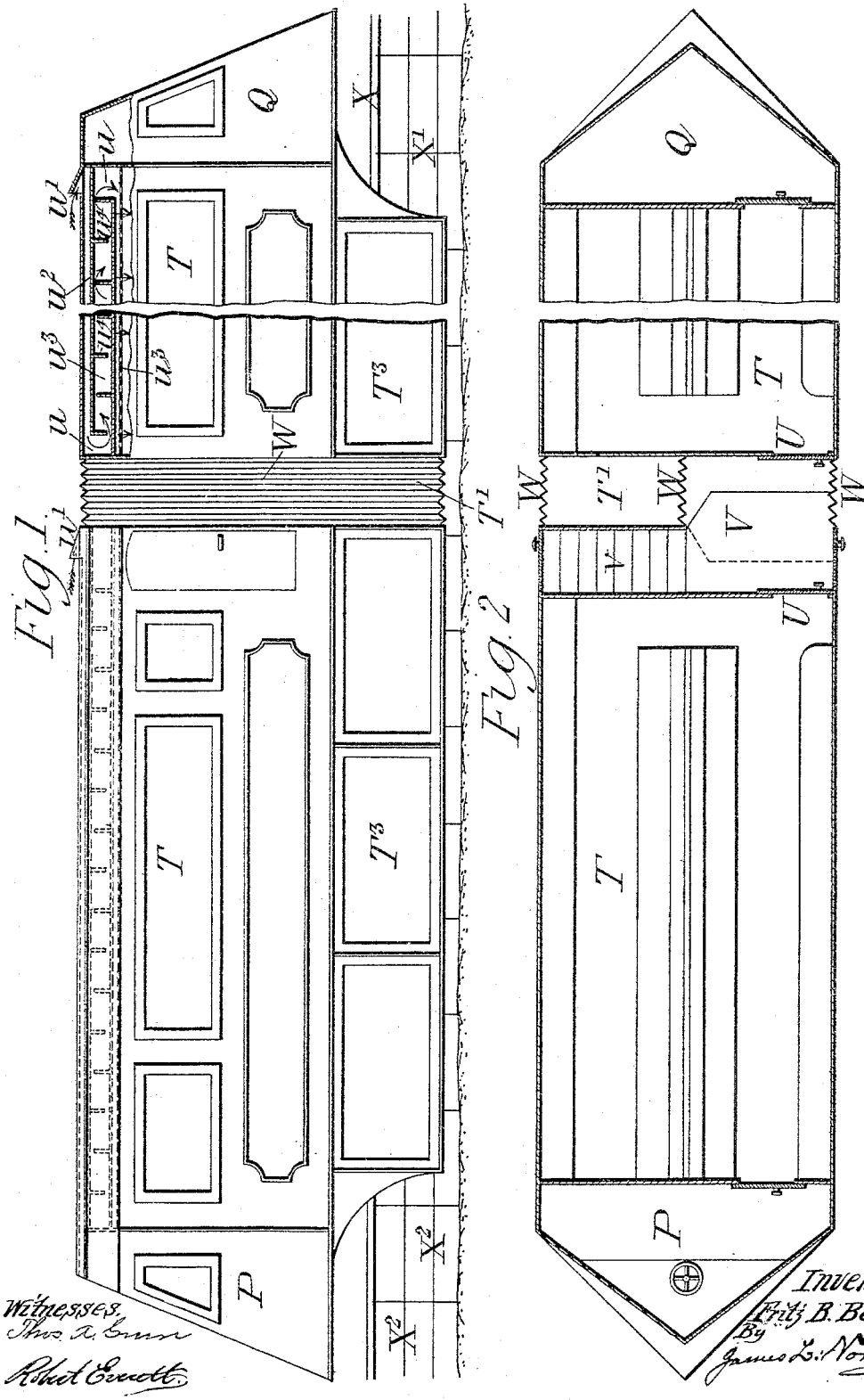

(No Model.) 6 Sheets—Sheet 2.
F. B. BEHR.
MOTOR VEHICLE FOR SINGLE RAIL ELEVATED RAILWAYS.
No. 552,812. Patented Jan. 7, 1896.
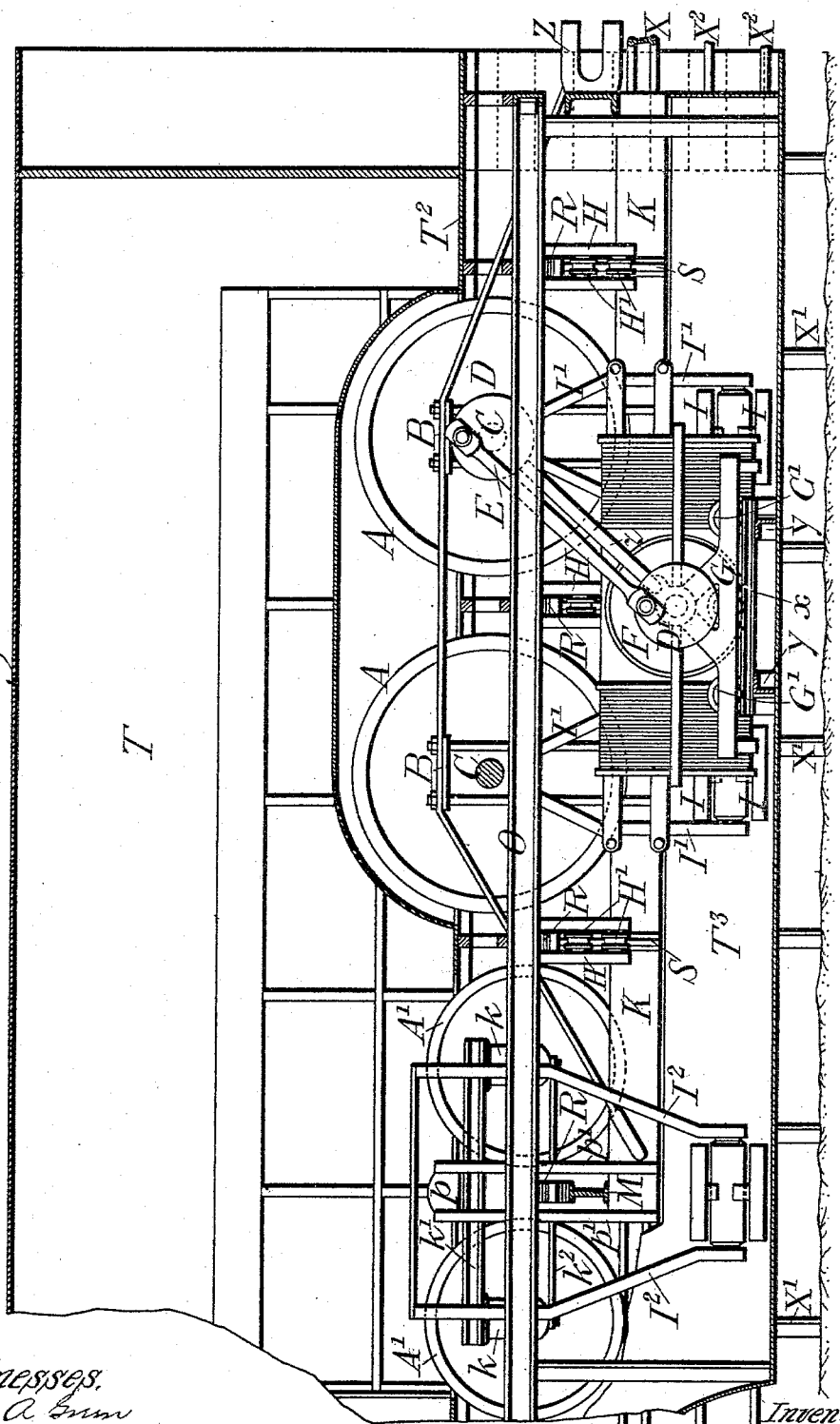
Witnesses.
Inventor.
Fritz B. Behr.
By James L. Norris, Atty.

(No Model.) 6 Sheets—Sheet 3.
F. B. BEHR.
MOTOR VEHICLE FOR SINGLE RAIL ELEVATED RAILWAYS.
No. 552,812. Patented Jan. 7, 1896.

Witnesses.
Inventor.
Fritz B. Behr.
By James L. Norris
Atty.

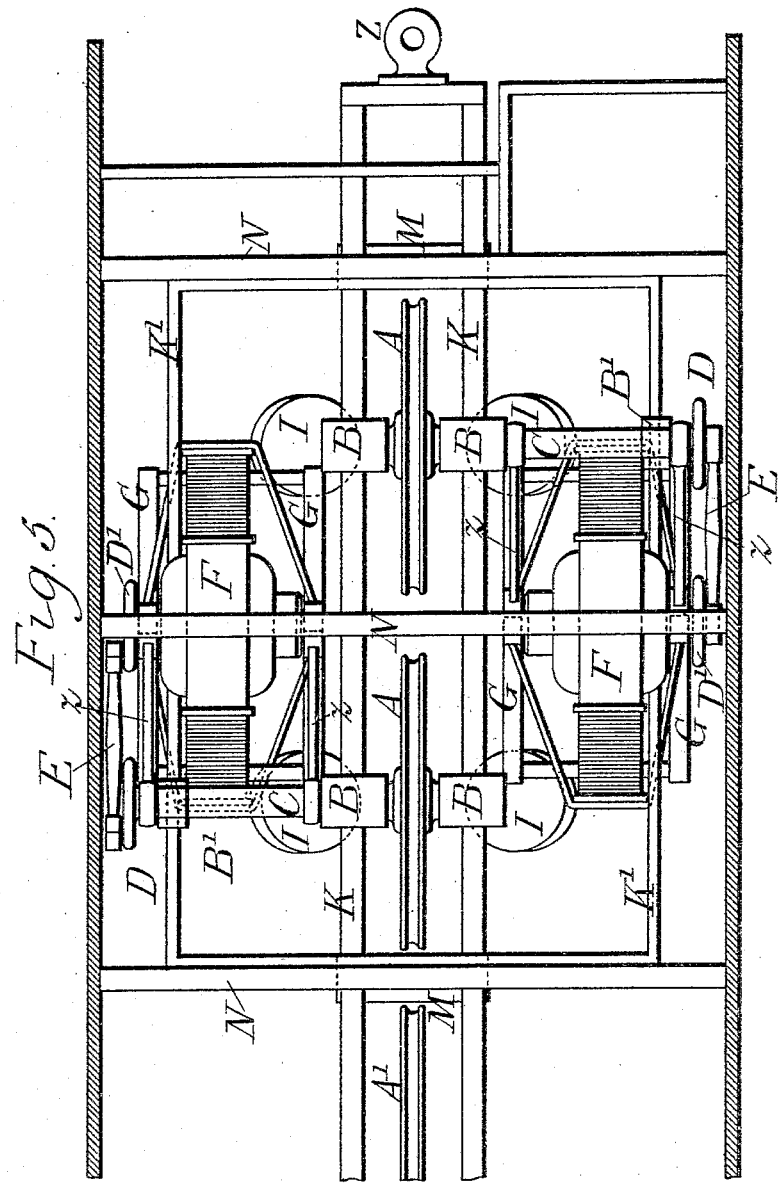

(No Model.)

F. B. BEHR.
MOTOR VEHICLE FOR SINGLE RAIL ELEVATED RAILWAYS.

No. 552,812.  Patented Jan. 7, 1896.

6 Sheets—Sheet 5.

Witnesses.

Inventor
Fritz B. Behr.
By James L. Norris
Atty.

(No Model.) 6 Sheets—Sheet 6.

F. B. BEHR.
MOTOR VEHICLE FOR SINGLE RAIL ELEVATED RAILWAYS.

No. 552,812. Patented Jan. 7, 1896.

Witnesses.
Thos. A. Gunn
Robert Everett

Inventor.
Fritz B. Behr.
By James L. Norris
Atty.

UNITED STATES PATENT OFFICE.

FRITZ B. BEHR, OF LONDON, ENGLAND.

MOTOR-VEHICLE FOR SINGLE-RAIL ELEVATED RAILWAYS.

SPECIFICATION forming part of Letters Patent No. 552,812, dated January 7, 1896.

Application filed September 26, 1895. Serial No. 563,735. (No model.)

*To all whom it may concern:*

Be it known that I, FRITZ BERNHARD BEHR, a citizen of England, residing at No. 10 Draper's Gardens, in the city of London, England, have invented certain new and useful Improvements in Motor-Vehicles for Single-Rail Elevated Railways, of which the following is a specification.

My invention relates to improvements in the construction of motor-vehicles for single-rail elevated railways where the vehicle is placed astraddle the rail—that is to say, with parts projecting down on each side thereof, which parts bear with guide-wheels against guide-rails fixed on each side of the supports, so as to prevent lateral motion of the vehicle.

My present improvements have mainly for their object, first, to allow of the carriages, which have a considerable total length, to pass readily round sharp curves. This I effect by constructing the carriage in two or more separate parts which are identical in construction and are jointed together by a pivot or universal joint and a flexible inclosure covering a platform between the two adjoining parts, from which access is gained to each part. Each half is supported on the rail on the one hand by two driving-wheels placed as close as practicable together, so as to obtain a comparatively small fixed wheel-base, and on the other hand by a two-wheel bogie.

Secondly, my improvements have for their object to arrange so that the center of gravity of the carriage shall be below the level of the line of rail, even when the entire floor for the passengers is raised above the line of rail, so as to gain access to the whole floor from one entrance only instead of requiring a separate entrance on each side of the carriage for gaining access to the two divided parts of the floor, as was heretofore the case. This I effect by placing the motors (whether electromotors or motors worked by fluid-pressure) that propel the carriage at the bottoms of the two lower parts of the vehicle and so arranging them that although they partake of the vertical motion of the carriage-body upon its springs the distance between their driving-shafts and the driving-wheel axles to which they are connected by driving-gear shall always remain constant.

Thirdly, my improvements relate to means whereby the carriage-body, though having a vertical motion on springs, is so guided that it cannot move laterally. This I effect by constructing the framing carrying the driving-wheels and bogie entirely separate from the framing of the carriage-body and guiding the former in a vertical position by means of guide-wheels running on lateral guide-rails on the line-rail supports, while the framing of the carriage-body which rests upon the wheel-framing with springs is prevented from lateral motion thereon by providing the wheel-frame with vertical rails, against which bear rollers attached to the carriage-body.

Fourthly, in place of providing only a single guide-rail on each side of the supports for the line of rail I provide two guide-rails situated one above the other, against which bear two corresponding guide-wheels on each side of the wheel-frame of the carriage, and in order to insure that both wheels shall always be kept automatically in contact with both the guide-rails, so as to distribute the lateral strains on the carriage uniformly over both, I mount the guide-wheels upon vertical arms projecting upward and downward from a horizontal axis that can turn in bearings in brackets on the wheel-frame.

I will proceed to describe the construction of a carriage embodying the several above-mentioned improvements with reference to the accompanying drawings, in which—

Figure 6:
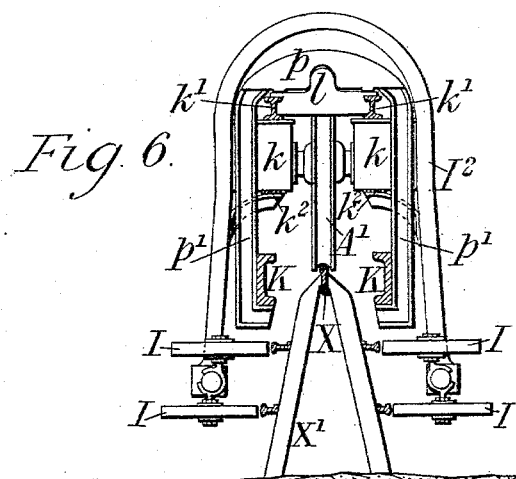
Figure 7:
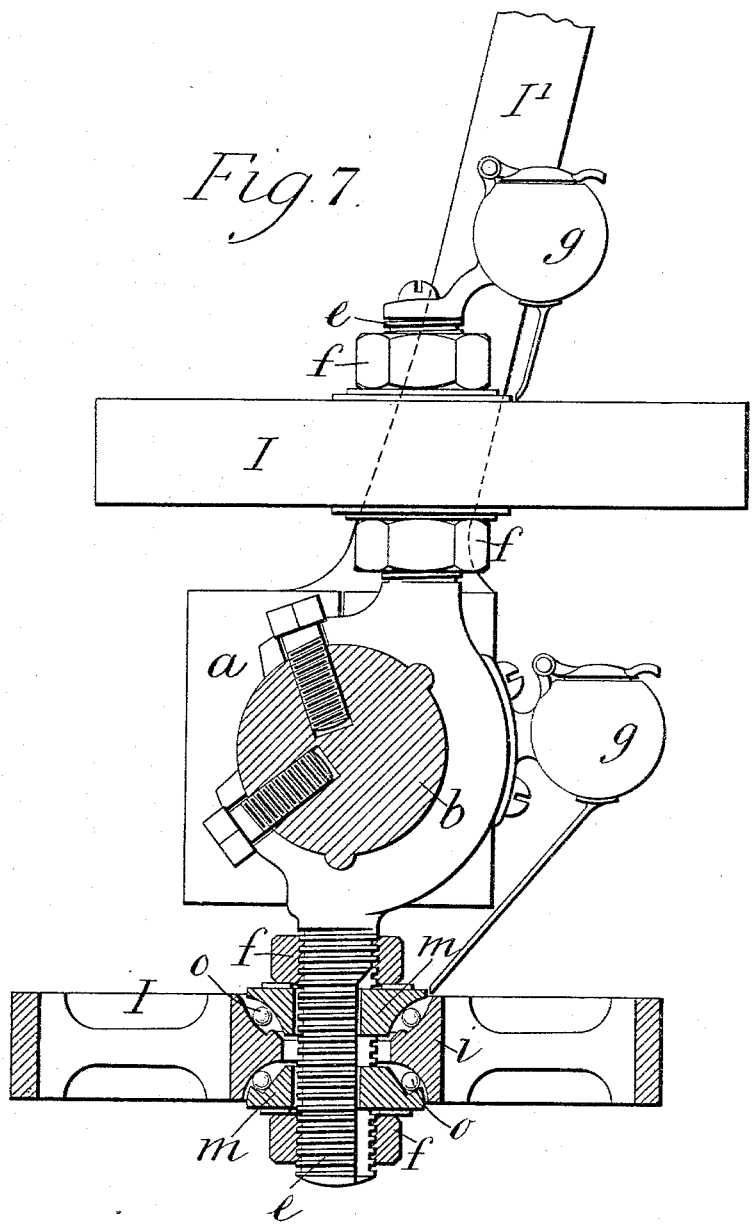

Figure 1 shows a side elevation of the two halves of the carriage partly in section. Fig. 2 shows a sectional plan. Fig. 3 shows a longitudinal section through the one part. Fig. 4 shows a cross-section; Fig. 5, a part plan; Fig. 6, a cross-section of the bogie; Fig. 7, an enlarged section and elevation of the guide-wheels and their mounting, and Figs. 8 and 9 a section and plan of the swivel-coupling.

The carriage consists of two separate bodies T T, being identical in construction and connected together by a flexible middle part T', where they are secured to each other by a pivot or universal-joint connection, as will be presently described. Each body is supported on the rail firstly by two driving-wheels A A placed one behind the other, as close as practicable together, so as to obtain a comparatively small rigid wheel-base, and two wheels A' A' mounted one behind the other in a bogie-frame, so that by these means the carriage is enabled to travel round very sharp curves. The driving-wheels A A are each carried by an axle C C, which axles extend in opposite directions rather more than half across the carriage, and run in two inner axle-boxes B B and an outer one B'. To the axle-boxes B B are secured by means of bolts L the main longitudinal bearers K of the wheel-frame, which bearers are tied across at intervals by the cross-pieces M, and upon these pieces the carriage-body is supported by means of the springs R.

The carriage-body is composed, first, of the upper part T for the passengers, the floor T² of which is entirely above the line of rail X, and, secondly, of the two downward extensions T³ T³ on each side of the line of rail, which parts serve respectively to contain one of the two motor-engines F that drive the axles C. These motors are shown as electromotors by way of example, but it is to be understood that any suitable kind of motor-engines worked by fluid-pressure may also be employed. These motors rise and fall upon the springs with the carriage-body, while the axles remain stationary, and in order therefore to maintain a constant distance between the motor-shaft and the axle for enabling these to be connected by driving-gear the motor-frames G are mounted on rollers G' running on rails x carried by the bottom frames y of the carriage, and the axle C is connected to the motor-shaft by means of two links or stays z z having eyes embracing the said parts. Thus as the motor F rises and falls relatively to the axle the links z z cause it to move to and from the vertical center line through the axle, while maintaining the distance between the two parts constant. The rotary motion of the motor-shaft may be imparted to the axle by any suitable driving-gear, such as by cranks D D' and connecting-rod E, as shown, in which arrangement the two shafts may be further coupled with their cranks at right angles by means of pitch-wheels and endless chain, or the motor-shaft may be connected to the axle by pitch-wheels and chain.

The outer bearings B' of the axles are supported by frames M' carried by the transverse pieces M of the bearers K.

The under framing of the carriage-body consists of the longitudinal girders O O and the transverse girders N. From these brackets H H pass downward, carrying rollers H', which bear against vertical rails S fixed to the bearers K. By this arrangement the carriage-body is prevented from having any lateral motion relatively to the wheel-frame, being strictly limited thereby to a vertical up-and-down motion upon the springs R.

The rollers H' are by preference covered with caoutchouc in order to prevent noise and afford a certain amount of elastic action. In order to maintain the wheel-frame and wheels in the vertical position upon the rail X there are provided on each side of the standards X' two guide-rails X², against which bear two guide-wheels I I, and in order to insure that these shall both bear equally on the two rails, so as to distribute the strain as uniformly as possible, I construct them as shown at Fig. 7. The wheels are mounted on arms e e extending upward and downward from an axis b carried in bearings a on the ends of a forked bracket I' fixed to the axle-boxes B. The arms e e are formed with a screw-thread upon which are screwed two nuts f f, and between these are two coned pieces m m that can slide with a groove and feather upon the arm. Between these pieces is mounted the coned boss i of the wheel I, and balls o o are interposed between the boss and the pieces m m, so that by proper adjustment of the nuts f the parts m m and i are made to constitute a ball-bearing, which will enable the wheels to revolve at a high rate of speed without appreciable wear, the bearing being tightened up by the nuts f when necessary and also adjusted longitudinally thereby relatively to the guide-rails X². The hollowed surfaces of the coned pieces and wheel-boss are so formed that the upper balls o in wearing will drop lower down, while when the lower balls wear the boss of the wheel will drop, thus rendering the bearing self-adjusting. The bearings are effectually lubricated from lubricators g. The construction of the bogie will be readily understood from Figs. 3 and 6. The axles of the running-wheels A' A' are carried in axle-boxes k secured rigidly together by bars k' k², of which k' carry the pivot-piece l, on which fits the swivel-cap p connected by looped frames p' to the longitudinal bearers K. The brackets I² carrying the lateral guide-wheels I are fixed to the axle-boxes k, as shown, and are joined together in looped form at top. By placing the electromotors F at the bottom of the lower parts of the carriage the center of gravity of the latter is brought so low down relatively to the line of rail X that I am enabled to raise the floor T² of the carriage for the passengers entirely above the rail, as before stated. By this means the whole of the carriage is rendered accessible from one side thereof through doors U opening onto the platform V between the two halves. This is formed of overlapping plates, as shown at Fig. 2, so as to allow of the angling of the two half-carriages, and it is inclosed partly by flexible material W for the same purpose.

Figure 8:
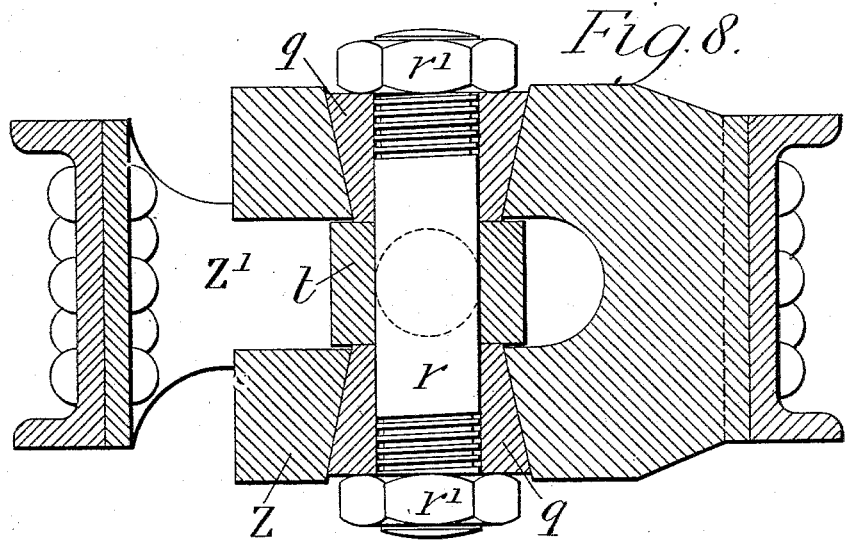
Figure 9:
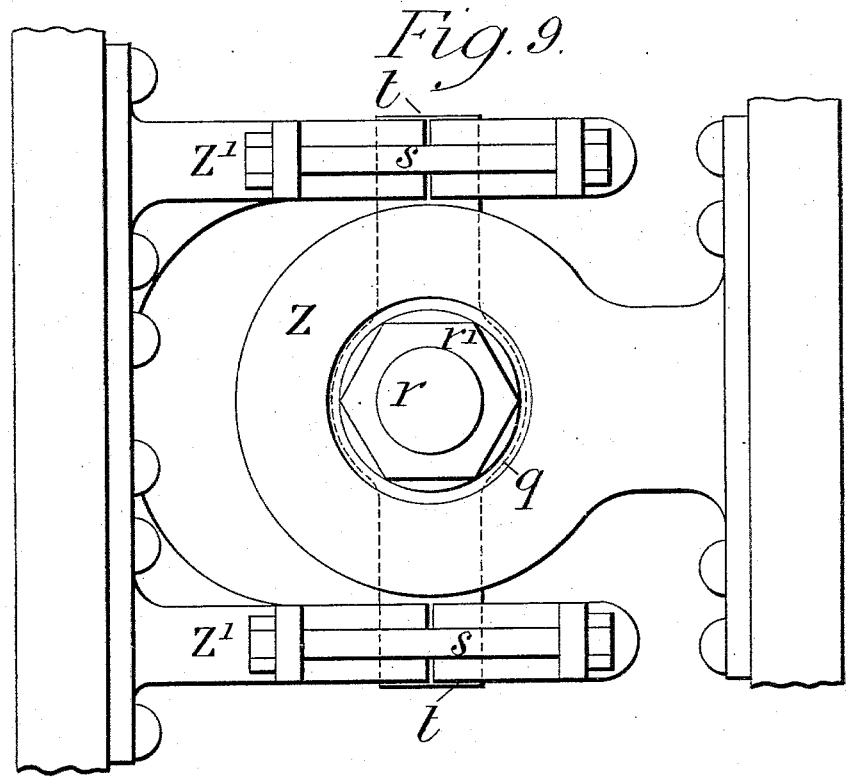

The platform is supported by extensions of the bearers K, to the ends of which are fixed the two halves of the swivel connection Z Z'. This is constructed as shown at Figs 8 and 9. To the one half-carriage is fixed the forked piece Z having coned holes, into which are fitted coned bushes q, and through this is passed the threaded swivel-bolt r, secured by nuts r', the bolt being connected to the bushes q by grooves and feathers, so as to cause these to turn with it.

On the other half-carriage is fixed the second connecting-piece Z', consisting of two branches s s forming bearings for a horizontal swivel-pin t extending through the fork of Z, where it is formed with an eye fitting over the middle of the vertical bolt r. Thus it will be seen that the swivel connection constitutes a universal joint, which allows of the two half-carriages assuming angular positions relatively to each other both in the horizontal and in the vertical direction.

The platforms at the stations will be at the same level as the platform V and floor $T^2$ of the carriage; but in order to allow of the descent of the passengers to the ground-level at intermediate points of the line, in cases of emergency, steps v are provided, as shown in Figs. 2 and 4.

For effecting the ventilation of the carriage I provide on the roof of the same a closed chamber u extending along the whole or part of the length of each half-carriage, and having at one end an opening u', Fig. 1, for the admission of air, from which the air passes along a narrow channel $u^2$ to the other end, where it enters a larger channel $u^3$, in which are baffle-plates $u^4$ that cause the air to pass in a zigzag direction back to the first-named end again. By this means the air, which, owing to the high rate of speed of the carriage, will enter the chamber u with a high velocity, will arrive at the end of the channel $u^3$ with a greatly-reduced velocity, so that it can be admitted thence through a perforated channel $u^5$ into the carriage.

The foul air can be expelled from the carriage in any convenient manner, such as by perforated vertical tubes in the corners, leading to external discharge-hoods directed away from the wind.

At the end of the one half-carriage is provided a compartment P for the electrician and at the end of the other half a compartment Q for the conductor, luggage, &c. These ends are by preference formed angular, as shown.

It will be evident that instead of constructing the above-described carriage of two halves, as described, it may be composed of three or more separate parts, all constructed and flexibly connected in precisely the same manner as above described—that is to say, with an entrance-platform between each two parts, the intermediate part or parts being made with flat ends. By this means a carriage or train of any desired length can be obtained which will possess the same facility for passing round sharp curves as that described.

The means for conveying the electrical energy from a main conductor connected with a source of current to the electromotors when such are employed may be of any suitable known description, and is therefore not shown on the drawings.

When motor-engines other than electromotors are employed with my improved construction of carriage, the store of solid or liquid fuel, together with the steam-generators, &c., would also be placed in the said lower parts of the carriage-body, so as to assist in lowering the center of gravity of the structure.

Having thus described the nature of my said invention and the best means I know for carrying the same into practical effect, I claim—

1. In a carriage for single rail elevated railways in which parts of the carriage project down on each side of the rail, the combination of two or more separate parts or carriage bodies connected together by a pivotal connection, with a platform intervening between them for gaining access thereto, each part being carried on the line of rail first by two driving wheels placed as closely together as possible so as to provide a very small fixed wheel base, and secondly by two-wheeled bogies, and motor engines situated in the downward extending parts of the carriage, and connected by driving gear to the driving wheels, substantially as described.

2. In a carriage for single line elevated railways, the combination with a carriage body having parts extending down on each side of the elevated line of rail, of a separate framing carrying two driving wheels and a bogie with two running wheels, and held in a vertical position by lateral guide wheels on which frame the body is free to oscillate vertically on springs and is guided vertically in such motion by rollers carried by the body frame running on vertical rails on the wheel frame, substantially as described.

3. In a carriage for single line elevated railways, the combination with a carriage body having parts extending down on each side of the elevated line of rail, of a separate wheel frame carrying two driving wheels and a bogie, and held in a vertical position on the rail by lateral guide rails, on which wheel frame the body is free to oscillate vertically on springs and is guided vertically in such motion by rollers carried by the body running on vertical rails on the wheel frame, and motor engines mounted on rollers on the bottom of the lower parts of the carriage body and connected by driving gear to the driving wheel axles, the shafts of such motor engines being connected with the driving wheel axles by pivoted links for maintaining the distance between the two parts constant notwithstanding the vertical motion of the motor engines relatively to the wheel axles, substantially as described.

4. In a carriage for single line elevated railways, the combination of a carriage body having a floor for passengers entirely raised above the line of rail, and two parts projecting down on each side of the rail, a separate wheel frame carrying two driving wheels and a two wheeled bogie, and supported against lateral motion by lateral guide wheels, springs supporting the carriage body upon the wheel frame, guide rollers on the carriage body running upon vertical rails on the wheel frame, and motor engines in the lower parts of the body, imparting motion to the driving wheels of the wheel frame, substantially as described.

5. In a carriage for single line elevated railways, a wheel frame separate from the carriage body and carrying two driving wheels and a two-wheel bogie, said wheel frame having parts descending on each side of the line of rail and provided with bearings carrying a horizontal axis having an upward and a downward extending arm on which are mounted two horizontal guide wheels adapted to run on two guide rails situated one above the other on each side of the rail supports, so that both guide wheels will always be maintained automatically in contact with their respective rails, substantially as and for the purposes described.

6. In a carriage for single line elevated railways, the combination of a wheel frame composed of two longitudinal bearers K K suspended from the axle boxes of the driving wheels by bolts L and connected by transverse pieces M carrying springs R supporting the carriage body, said bearers K K being also suspended by frames $p'$ from a swivel cap $p$ bearing on the pivot pin $l$ carried by bars $k'$ fixed to the axle boxes $k$ of the bogie wheels A' substantially as described.

7. In a carriage for single line elevated railways, the combination of the two axles C of the two driving wheels A A, carried by a separate wheel frame and extending from such wheels to opposite sides of the carriage, two motor engines F F supported on rollers on the bottom of the lower parts of the carriage body T which is capable of vertical motion on springs relatively to the wheel frame, means for transmitting the motion of the motor engines to the wheel axles, and links Z Z connecting the axles C C with the motor shafts so as to maintain the distance between these constant notwithstanding any vertical motion of the motor engines relatively to the wheel axles, substantially as described.

8. In a carriage for single line elevated railways, the combination of a carriage body T having a passenger floor $T^2$ entirely above the level of the line of rail, and two lower parts descending on each side of the line of rails and containing motor engines F F for propelling the carriage, a separate wheel frame K M M' with axle boxes B B B' carrying axles C C of the driving wheels A A, a bogie frame with wheels A' A' and pivot piece $l$, supporting a frame $p p'$ fixed to the wheel frame K, brackets I' $I^2$ fixed respectively to the wheel frame and the bogie frame and carrying two lateral guide wheels I I on each side adapted to run on two guide rails on each side of the rail supports, vertical guide rails S on each side of the wheel frame, springs R on the wheel frame, supporting the carriage body, brackets H on the latter carrying rollers H' bearing against said guide rails S on the wheel frame, and means for imparting the rotary motion from the motor shafts to the driving wheel axles, substantially as described.

In testimony whereof I have signed my name to this specification, in the presence of two subscribing witnesses, this 17th day of September, A. D. 1895.

FRITZ B. BEHR.

Witnesses:
EDWD. SKILTON,
GEORGE HENRY HADDEN.